US012812477B2

(12) United States Patent
Bashir et al.

(10) Patent No.: US 12,812,477 B2
(45) **Date of Patent: *Nov. 24, 2026**

(54) ANCHOR POINT MOVEMENT IN A COMPOUND CELLULAR NETWORK

(71) Applicant: DISH Wireless L.L.C., Littleton, CO (US)

(72) Inventors: Kazi Bashir, Lewisville, TX (US); Mehdi Alasti, Arlington, VA (US); Siddhartha Chenumolu, Ashburn, VA (US)

(73) Assignee: DISH Wireless L.L.C., Littleton, CO (US)

( * ) Notice: Subject to any disclaimer, the term of this patent is extended or adjusted under 35 U.S.C. 154(b) by 377 days.

This patent is subject to a terminal disclaimer.

(21) Appl. No.: 18/394,566

(22) Filed: Dec. 22, 2023

(65) Prior Publication Data

US 2024/0129807 A1 Apr. 18, 2024

Related U.S. Application Data

(63) Continuation-in-part of application No. 17/867,864, filed on Jul. 19, 2022, now Pat. No. 11,856,464, (Continued)

(51) Int. Cl.
*H04W 36/00* (2009.01)
*H04W 36/12* (2009.01)
(Continued)

(52) U.S. Cl.
CPC ..... *H04W 36/0022* (2013.01); *H04W 36/125* (2018.08); *H04W 48/17* (2013.01); *H04W 88/06* (2013.01); *H04W 88/16* (2013.01)

(58) Field of Classification Search
CPC ... H04W 16/14; H04W 60/00; H04W 60/005; H04W 68/02; H04W 76/16; H04W 88/06;
(Continued)

(56) References Cited

U.S. PATENT DOCUMENTS 11,523,319 B2 * 12/2022 Ryu ...................... H04W 36/14
12,238,671 B2 * 2/2025 Shan ...................... H04W 4/46
(Continued)

FOREIGN PATENT DOCUMENTS

CN 103327531 A 9/2013
CN 102498750 A 10/2015
(Continued)

OTHER PUBLICATIONS

Ericsson et al: "Overall evaluation and conclusion of key issue 6 for NWDAF assisting traffic routing", 3GPP Draft; S2-1813201_WAS12797_WAS12370_NWDAF Assisted Traffic Routing, 3rd Generation Partnership Project (3GPP), Mobile Competence Centre ; 650, Route Des Lucioles ; F-06921 Sophia-Antipolis Cedex, vol. SA WG2, no. West Palm Beach, USA; Nov. 26, 2018 Nov. 30, 2018 Nov. 30, 2018 (Nov. 30, 2018), XP051499690, Retrieved from the Internet; URL: http: //mm . 3gpp. org/ftp/tsg%5Fsa/WG2%5FArch/TSGS2%5F129BIS%5FWest%5FPalm%5FBeach /Docs/S2%2D1813201%2Ezip [retrieved on Nov. 30, 2018] p. 1-p. 5.
(Continued)

*Primary Examiner* — Nathan S Taylor
(74) *Attorney, Agent, or Firm* — Kilpatrick Townsend & Stockton LLP

(57) ABSTRACT

Various hybrid cellular communication systems and methods are presented herein. A first cellular network can include multiple user plane functions (UPFs). Each UPF can serve as a gateway for user equipment (UE) to communicate with a remotely-hosted service. Which UPF serves as the gateway for a UE is adjusted while the UE remains connected with the first cellular network. While connected with the first cellular network, a multiple access (MA) packet data unit (PDU) session is active for the UE that allows for communication to occur concurrently between the UE and the remotely-hosted service via an access point (AP) and via a
(Continued)

UPF. While connected with a second cellular network distinct from the first cellular network, a single access PDU session is active that allows for communication to occur with the service via a second UPF of the second cellular network.

20 Claims, 8 Drawing Sheets

Related U.S. Application Data which is a continuation of application No. 17/009,578, filed on Sep. 1, 2020, now Pat. No. 11,425,610, which is a continuation of application No. 16/680,094, filed on Nov. 11, 2019, now Pat. No. 10,841,844.

(60) Provisional application No. 62/886,916, filed on Aug. 14, 2019.

(51) Int. Cl.
*H04W 48/00* (2009.01)
*H04W 88/06* (2009.01)
*H04W 88/16* (2009.01)

(58) Field of Classification Search
CPC . H04W 8/06; H04W 28/0273; H04W 28/085; H04W 36/0066; H04W 36/0069; H04W 80/02; H04W 28/02; H04W 28/08; H04W 36/125; H04W 36/0022; H04W 48/17; H04W 88/16; H04L 45/22; H04L 47/34; H04L 12/707; H04L 12/801
USPC .......................................................... 455/439
See application file for complete search history.

(56) References Cited

U.S. PATENT DOCUMENTS

| | | | | |
|---|---|---|---|---|
| 2013/0021968 | A1 | 1/2013 | Reznik et al. | |
| 2013/0166746 | A1 | 6/2013 | Andreasen et al. | |
| 2016/0044690 | A1 | 2/2016 | Li et al. | |
| 2017/0085494 | A1 | 3/2017 | Park et al. | |
| 2017/0374573 | A1 | 12/2017 | Kleinbeck et al. | |
| 2018/0020386 | A1 | 1/2018 | Chandramouli et al. | |
| 2018/0020418 | A1 | 1/2018 | Chandramouli et al. | |
| 2018/0070253 | A1* | 3/2018 | Kleinbeck | H04W 24/08 |
| 2018/0092142 | A1 | 3/2018 | Han et al. | |
| 2018/0199328 | A1 | 7/2018 | Sang et al. | |
| 2018/0227219 | A1 | 8/2018 | Zhang et al. | |
| 2018/0279375 | A1 | 9/2018 | Jeon et al. | |
| 2018/0288657 | A1 | 10/2018 | Stojanovski et al. | |
| 2018/0288784 | A1 | 10/2018 | Stojanovski et al. | |
| 2018/0302834 | A1 | 10/2018 | Zhang et al. | |
| 2019/0053117 | A1 | 2/2019 | Bae et al. | |
| 2019/0159074 | A1* | 5/2019 | Velev | H04W 36/00226 |
| 2019/0166506 | A1 | 5/2019 | Ashrafi | |
| 2019/0174449 | A1* | 6/2019 | Shan | H04W 60/00 |
| 2019/0260811 | A1* | 8/2019 | Kim | H04L 65/1073 |
| 2019/0306752 | A1* | 10/2019 | Lai | H04W 28/0925 |
| 2019/0373505 | A1* | 12/2019 | Jun | H04W 80/10 |
| 2020/0037165 | A1* | 1/2020 | Kunz | H04W 12/10 |
| 2020/0178196 | A1* | 6/2020 | Wang | H04W 60/005 |
| 2020/0221527 | A1* | 7/2020 | Bharatia | H04W 76/20 |
| 2020/0229035 | A1* | 7/2020 | Kim | H04W 8/08 |
| 2020/0229059 | A1 | 7/2020 | Xu et al. | |
| 2020/0236727 | A1* | 7/2020 | Salkintzis | H04W 48/18 |
| 2020/0348409 | A1 | 11/2020 | McLaughlin et al. | |
| 2021/0007166 | A1* | 1/2021 | Liao | H04W 48/16 |
| 2021/0014742 | A1* | 1/2021 | Wang | H04W 36/0027 |
| 2021/0037585 | A1* | 2/2021 | Youn | H04W 60/06 |
| 2021/0099367 | A1 | 4/2021 | Han et al. | |
| 2021/0119866 | A1 | 4/2021 | Premnath et al. | |
| 2021/0321258 | A1* | 10/2021 | Salkintzis | H04L 63/0884 |
| 2022/0104313 | A1* | 3/2022 | Park | H04W 88/06 |
| 2022/0124542 | A1 | 4/2022 | Li et al. | |
| 2022/0132454 | A1* | 4/2022 | Youn | H04W 60/00 |
| 2022/0167446 | A1* | 5/2022 | Youn | H04W 76/16 |
| 2022/0345938 | A1 | 10/2022 | Gupta et al. | |
| 2022/0361272 | A1* | 11/2022 | Sugawara | H04W 76/12 |
| 2023/0180038 | A1 | 6/2023 | Chen et al. | |
| 2023/0184872 | A1 | 6/2023 | Kalogiros et al. | |
| 2023/0239745 | A1* | 7/2023 | Ke | H04W 36/144 370/331 |
| 2024/0022891 | A1* | 1/2024 | Ryu | H04L 61/2591 |

FOREIGN PATENT DOCUMENTS

| | | | |
|---|---|---|---|
| CN | 102498750 | B | 10/2015 |
| CN | 107770828 | A | 3/2018 |
| CN | 108401269 | A | 8/2018 |
| CN | 108632924 | A | 10/2018 |
| CN | 109 392 043 | A | 2/2019 |
| CN | 108632917 | B | 8/2019 |
| CN | 107950056 | A | 2/2021 |
| CN | 107950056 | B | 2/2021 |
| CN | 108811000 | B | 2/2021 |
| CN | 109996303 | B | 6/2021 |
| EP | 4 145 882 | A1 | 3/2023 |
| JP | 2017143350 | A | 8/2017 |
| WO | 2018/128494 | A1 | 7/2018 |
| WO | 2018/128529 | A1 | 7/2018 |
| WO | 2019/072902 | A1 | 4/2019 |
| WO | 2020252377 | A1 | 12/2020 |
| WO | 2021/091439 | A1 | 5/2021 |
| WO | 2021/218718 | A1 | 11/2021 |

OTHER PUBLICATIONS

"3rd Generation Partnership Project; Technical Specification Group Services and System Aspects; Management and orchestration; Study on enhancement of Management Data Analytics (MDA) (Release 17)", 3GPP Standard; Technical Report; 3GPP TR 28.809, 3RD Generation Partnership Project (3GPP), Mobile Competence Centre ; 650, Route Des Lucioles ; F-06921 Sophia-Antipolis Cedex ; Prance, vol. SA WG5, No. V17.0.0 Apr. 6, 2021 (Apr. 6, 2021), pp. 1-96, XP052000543, Retrieved from the Internet: URL:https://ftp.3gpp.org/Specs/archive/28_ series/28.809/28809-h00.zip 28809-h00.docx [retrieved on Apr. 6, 2021] p. 12 p. 75-p. 76.

Telstra et al: "Support for Hybrid Access and Atsss", 3GPP Draft; S2-1906288_WAS6278_WAS6236_ WAS5007 _5WWC_HYBRID ACCESS_ATSSS_5G-RG_ V1, 3rd Generation Partnership Project (3GPP), Mobile Competence Centre; 650, Route Des Lucioles; F-06921 Sophia-Antipoli, vol. SA WG2, no. Reno, NV, USA; May 13, 2019-May 17, 2019 May 17, 2019, XP051743973, Retrieved from the Internet: URL: http://VVVV'•N.3gpp.org/ftpitsg%5Fsa/\NG2%5FArch!TSGS2%5FRenoiDocs!S2%2Di906288%2Ezip [retrieved on May 17, 2019] Paragraph "Proposal".

ZTE: "Discussion on relay architecture supporting IAB", 3GPP Draft; R3-180792, 3rd Generation Partnership Project (3GPP), Mobile Competence Centre; 650, Route Des Lucioles; F-06921 Sophia-Antipolis Cedex; France, vol. RAN WG3, no. Athens, Greece; Feb. 26, 2018-Mar. 2, 2018 Feb. 14, 2018, XP051401225, Retrieved from the Internet: URL:http;/13gpp.orglftp!tsg%5FrnnN\JG3%5F!WTSGR3%5H19/Dor.s/ [retrieved on Feb. 14, 2018] Paragraph 2. Discussion.

CATT "TS 23.502: Indirect data forwarding for 5GS to EPS handover," S2-174585, SA WG2 Meeting #122bis Jun. 26-30, 2017, San Jose Del Cabo, Mexico, 5 pages.

CATT "TS 23.502: Indirect data forwarding for 5GS to EPS handover," S2-175902, SA WG2 Meeting #122bis Aug. 21-25, 2017, Sophia Antipolis , France, 5 pages.

* cited by examiner

ANCHOR POINT MOVEMENT IN A COMPOUND CELLULAR NETWORK

CROSS REFERENCE TO RELATED APPLICATION

This application is a continuation-in-part of U.S. patent application Ser. No. 17/867,864, filed Jul. 19, 2022, entitled "Anchor Point Movement in a Compound Cellular Network," which is a continuation of U.S. patent application Ser. No. 17/009,578, filed Sep. 1, 2020, entitled "Anchor Point Movement in a Compound Cellular Network," now U.S. Pat. No. 11,425,610, which is a continuation of U.S. patent application Ser. No. 16/680,094, filed on Nov. 11, 2019, now U.S. Pat. No. 10,841,844, which claims priority to U.S. Provisional Application No. 62/886,916, filed Aug. 14, 2019, entitled "Anchor Point Movement in a Compound Cellular Network," the entire disclosures of which are hereby incorporated by reference for all purposes.

BACKGROUND

When designing a cellular network, a cellular network operator may need to balance various factors, including balancing a desire to use the most efficient and newest cellular network architecture against having backwards compatibility with previous-generation cellular networks. Embodiments detailed herein allow a cellular network operator to realize the benefits of using both the most up-to-date cellular network architecture and obtaining compatibility with previous-generation equipment.

SUMMARY

Various embodiments are described related to a system for hybrid cellular communication. In some embodiments, a system for hybrid cellular communication is described. The system may comprise a first cellular network comprising a plurality of user plane functions (UPFs). Each UPF of the plurality of UPFs may serve as a gateway for user equipment (UE) to communicate with a remotely-hosted service. Which UPF of the plurality of UPFs serves as the gateway for a particular UE may be adjusted while the particular UE remains connected with the first cellular network. The system may comprise the UE. While connected with the first cellular network a multiple access (MA) packet data unit (PDU) session is active that may allow for communication to occur concurrently between the UE and the remotely-hosted service via an access point (AP) of a plurality of APs and via a UPF of the plurality of UPFs. While connected with a second cellular network distinct from the first cellular network, a single access PDU session is active that may allow for communication to occur with the service via a second UPF of the second cellular network.

Embodiments of such a system may include one or more of the following features: the plurality of APs may allow for access to one or more wireless local area networks (WLANs). After being connected with the second cellular network distinct from the first cellular network and using the single access PDU session for communicating with the service, reestablish the MA PDU session that may allow for communication to occur concurrently between the UE and the remotely-hosted service via the AP of the plurality of APs and via the UPF of the plurality of UPFs. After being connected with the second cellular network distinct from the first cellular network and using the single access PDU session for communicating with the service, establishes a second MA PDU session that may allow for communication to occur concurrently between the UE and the remotely-hosted service via a second AP of the plurality of APs and via a third UPF of the plurality of UPFs. The first cellular network may operate according to session and service continuity (SSC) mode 2 or SSC mode 3. The plurality of WLAN APs may create one or more WiFi networks. The first cellular network may be a 5G New Radio (NR) cellular network and the second cellular network may be a 5G NR cellular network. While the single access PDU session may be active that allows for communication to occur with the service via the second UPF, communication with the service may not be performed via a WLAN AP. While the MA PDU session is established, Access Traffic Steering Switching and Splitting (ATSSS) may be used by the UE to direct traffic via the AP and the UPF.

In some embodiments, a method for performing hybrid cellular communication is described. The method may comprise accessing, by a user equipment (UE), a remotely-hosted service via a data network, using a first user plane function (UPF) of a plurality of UPFs of a first cellular network. The method may comprise establishing, by the UE, a multiple access (MA) packet data unit (PDU) session that may allow for communication to occur concurrently between the UE and the remotely-hosted service via an access point (AP) of a plurality of APs and via a UPF of the plurality of UPFs. The method may comprise accessing, by the UE, the remotely-hosted service, using a second user plane function (UPF) of a second cellular network. The MA PDU session may not be available while connected with the second cellular network and a single access PDU session may be used for communicating with the remotely-hosted service. The method may comprise resuming, by the UE, accessing the remotely-hosted service via the first UPF of the plurality of UPFs of the first cellular network. The method may comprise in response to resuming accessing the remotely-hosted service via the first UPF, reestablish, by the UE, the MA PDU session.

Embodiments of such a method may include one or more of the following features: the plurality of APs may allow for access to one or more wireless local area networks (WLANs). In response to the MA PDU session being reestablished, accessing the remotely-hosted service via a second AP of the plurality of APs and a third UPF of the plurality of UPFs. The first cellular network and the second cellular network may operate according to session and service continuity (SSC) mode 2 or SSC mode 3. The plurality of WLAN APs may create one or more WiFi networks. The first cellular network may be a 5G New Radio (NR) cellular network and the second cellular network may be a 5G NR cellular network. The method may further comprise moving, by the UE, to a second location from a first location, wherein the second cellular network is accessed at the second location. The method may further comprise moving, by the UE, to the first location from the second location. The first cellular network may be accessed at the first location. The method may comprise, while accessing the remotely-hosted service via the data network, using the first cellular network, using a second UPF of the plurality of UPFs of the first cellular network to access the remotely-hosted service via the data network. In response to the MA PDU session being reestablished, accessing the remotely-hosted service via the AP of the plurality of APs and the first UPF of the plurality of UPFs. While the MA PDU session may be established, using Access Traffic Steering Switching and Splitting (ATSSS) to direct traffic via the AP and the UPF.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1A:
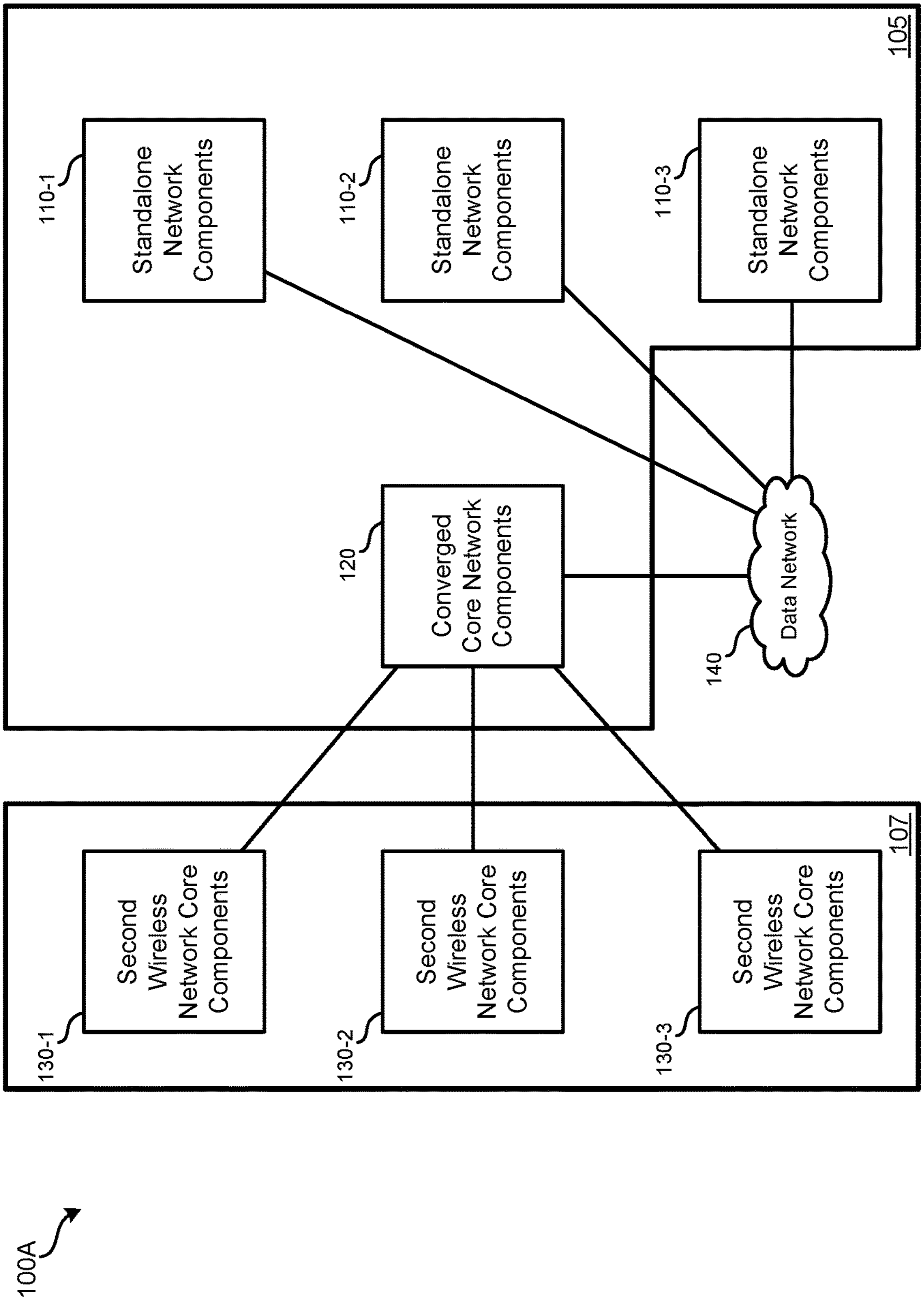
FIG. 1A illustrates an embodiment of a block diagram of a communication environment that includes a compound cellular network.

A wireless cellular network, such as a 5G New Radio (NR) cellular network, can be constructed using various architectures. A first architecture may only use one radio access technology (RAT) or a single wireless cellular communication protocol, such as 5G NR for the radio access network (RAN) and a 5G core as the cellular network's core componentry. Such a dedicated 5G NR wireless cellular network can be referred to as a "standalone 5G network" and can have certain advantages, such as having a simpler architecture and less expensive to deploy than other forms of cellular networks that include compatibility for other cellular communication protocols. However, a drawback to a standalone 5G network may be the lack of compatibility for other cellular protocols. For instance, user equipment (UE) roaming on a non-5G cellular network (e.g., a 4G LTE network) or non-standalone 5G cellular network (e.g., a network that uses 5G for communication with UE but where the core network uses 4G Evolved Packet Core (EPC)) may not be possible if the UE's home cellular network's architecture is a standalone 5G network that has a 5G core and, therefore, does not support additional wireless communication protocols to enable communication with an EPC.

A second possible architecture for a wireless cellular network can involve the cellular network being accessible via multiple RATs or multiple wireless cellular communication protocols. For instance, a cellular network could be compatible with 4G LTE and 5G NR. While such a network may have both 4G and 5G network components, the network core may use 4G components, which can be referred to as a 4G core or EPC. Such an arrangement may have the advantage of being able to accommodate multiple RATs, may help transition from 4G to 5G, and faster deployment of 5G, but may have the drawback of using a less efficient (and possibly more expensive) core network architecture. The core network may be built around an older RAT, such as 4G's EPC architecture with compatibility incorporated for 5G.

An anchor point refers to the cellular network core component that serves as a gateway between an external data network, such as the Internet, and the user equipment. For some types of cellular networks, such as the previously-detailed second architecture that can use 4G EPC, the anchor point is fixed. That is, regardless of where the UE physically moves while connected with the cellular network, even if hundreds or thousands of miles away, the network's core component that functions as the anchor point between the UE and the data network remains the same. Such an arrangement can result in increased latency, lower bandwidth, or both due to the increased path length between the UE and the data network. However, for some other types of cellular networks, such as the previously-discussed first architecture that uses a 5G NR core, the anchor point can be adjusted to decrease latency. Depending on the mode of the cellular network, the anchor point can be reassigned as the UE moves. Therefore, an anchor point that is most efficient (e.g., lowest latency, greatest bandwidth, shortest physical distance) may be used based on where the UE is located.

Embodiments detailed herein capture at least some of the advantages of the first architecture and the second architecture. For instance, embodiments detailed herein focus on a compound cellular network that uses 5G core components (and allow for the anchor point to be varied). However, near physical edges of the network footprint, where a UE is more likely to travel into a region where roaming occurs on a separate cellular network (e.g., another carrier's 4G LTE network), converged core components may be used that are compatible with multiple RATs (e.g., 5G and 4G).

Further detail is provided in reference to the figures. FIG. 1A illustrates an embodiment of a block diagram of a communication environment 100A that includes a compound cellular network. Communication environment 100A can include compound cellular network 105 and cellular network 107. Compound cellular network 105 may be the primary (e.g., home) cellular network for various pieces of UE. However, occasionally, the UE may use cellular network 107 for cellular service, such as in geographical areas where a connection with a base station (BS) of compound cellular network 105 cannot be obtained. Physically, it is possible that compound cellular network 105 may cover a wholly different geographical region than cellular network 107. However, in many embodiments, there is significant overlap in the geographical regions serviced by compound cellular network 105 and cellular network 107.

Compound cellular network 105 may include multiple generations of cellular network core components. Compound cellular network 105 may include multiple standalone network components 110 (e.g., 110-1, 110-2, 110-3). Each of these standalone network components 110 may employ a single RAT, such as 5G NR. When UE physically moves within regions covered by compound cellular network 105, the UE may switch among using various standalone network components 110 as an anchor point to access data network 140, which may be the Internet. An anchor point defines the componentry of the cellular network that serves as a gateway between the cellular network and an external data network, such as the Internet. For instance, when a UE is in the vicinity of standalone network components 110-1, core components of standalone network components 110-1 may be used to access data network 140. At another time, the UE may be located in the vicinity of standalone network components 110-3, core components of standalone network components 110-3 may then be used to access data network 140.

Converged core network components 120 of compound cellular network 105 can function similarly to standalone network components 110 while a UE is in communication with compound cellular network 105. That is, if a UE moves to a geographic region near converged core network components 120, converged core network components 120 may be used as an anchor point to access data network 140. If the UE then moves away and is closer to, for example, standalone network components 110-2, standalone network components 110-2 may begin being used as the anchor point to access data network 140.

Converged core network components 120 has additional capabilities beyond standalone network components 110. While standalone network components 110 can communicate using only a single cellular RAT, such as 5G, converged core network components 120 include core components that function using multiple cellular standards, such as 5G NR and 4G LTE EPC. When UE is communicating with cellular network 107, which can be a 4G LTE cellular network, non-standalone 5G cellular network, or a cellular network based on some other RAT, regardless of which of second cellular network core components 130 that the UE is communicating with, converged core network components 120 remains used as the anchor point to access data network 140. Therefore, regardless of where the UE roams within cellular network 107, the anchor point is fixed to be converged core network components 120.

In order to decrease latency, converged core network components 120 may be located near where UE is expected to use cellular network 107. For instance, converged core network components 120 can be located near where a coverage area of compound cellular network 105 ends, but where coverage of cellular network 107 begins or continues.

Figure 1B:
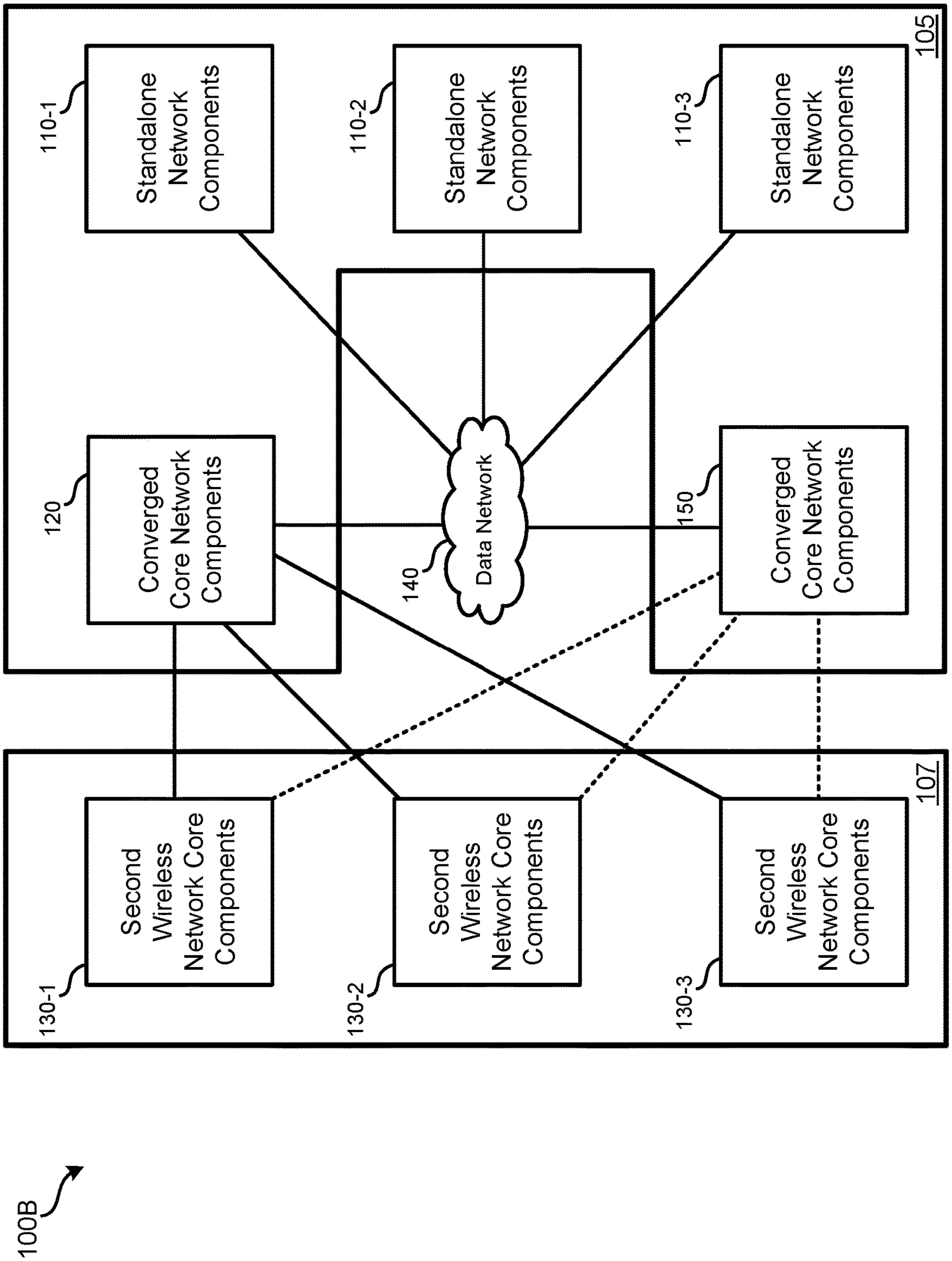
FIG. 1B illustrates another embodiment of a block diagram of a communication environment that includes a compound cellular network.

FIG. 1B illustrates another embodiment of a block diagram of a communication environment 100B that includes a compound cellular network. In communication environment 100B, multiple converged core network components (120, 150) are illustrated as part of compound cellular network 105. As detailed in relation to FIG. 1A, compound cellular network 105 may include multiple standalone network components 110 (e.g., 110-1, 110-2, 110-3). Each of these standalone network components 110 may employ a single RAT, such as 5G NR. When UE physically moves within regions covered by compound cellular network 105, the UE may switch among using various standalone network components 110 as an anchor point to access data network 140, which may be the Internet.

Converged core network components 120 and 150 of compound cellular network 105 can function similarly to standalone network components 110 while a UE is in communication with compound cellular network 105. That is, if a UE moves to a geographic region near converged core network components 120 or converged core network components 150, converged core network components 120 or 150 may be used as an anchor point to access data network 140.

Converged core network components 120 and 150 include core components that function using multiple cellular standards, such as 5G NR and 4G LTE EPC. When a UE transitions to communicating using cellular network 107 instead of compound cellular network 105, the components of compound cellular network 105 used as the anchor point to access data network 140 becomes fixed. For instance, if the UE was previously communicating with converged core network components 120 and then roams onto cellular network 107, converged core network components 120 may be used as the fixed anchor point for as long as the UE is roaming on cellular network 107 (regardless of where the UE roams within cellular network 107). If the UE was previously communicating with converged core network components 150 and then roams onto cellular network 107, converged core network components 150 may be used as the fixed anchor point for as long as the UE is roaming on cellular network 107 (regardless of where the UE roams within cellular network 107).

The UE may be assigned a particular converged core network components of compound cellular network 105 when the UE begins roaming on cellular network 107 to be used as the anchor point for the duration of the time that the UE is roaming on cellular network 107. For instance, if a UE was previously connected with standalone network components 110-2 then is next connected with second cellular network core components 130-2 of cellular network 107, either converged core network components 120 or converged core network components 150 may be selected by compound cellular network 105 to serve as the anchor point for the UE for the duration of the time that the UE is roaming within cellular network, regardless of where the UE roams within cellular network 107. The selection may be based on latency, geographic location, or one or more other factors.

As an example of how an anchor point is locked, if a UE connects with cellular network 107 using second cellular network core components 130-1, converged core network components 120 of compound cellular network 105 may be locked as the anchor point for accessing data network 140. If the UE moves and later communicates with second cellular network core components 130-3, even if converged core network components 150 would have lower latency or is geographically closer, converged core network components 120 remains used as the anchor point for the duration of the time that the UE is connected with cellular network 107.

If the UE disconnects from cellular network 107 and communicates directly with either converged core network components 120, converged core network components 150, or one or standalone network components 110, the anchor point may resume being shifted among these components. If the UE then reconnects with cellular network 107, an anchor point may be selected (and thus may be a different converged core network components of compound cellular network 105) and again may be locked.

In the examples of FIGS. 1A and 1B, the number of standalone network components 110, converged core network components 120 and 150, and second cellular network core components 130 is merely exemplary. In real-word implementations, the number of cellular networks from which a UE can roam onto from compound cellular network 105 may be greater than one and many more components and components may be present.

Figure 2:
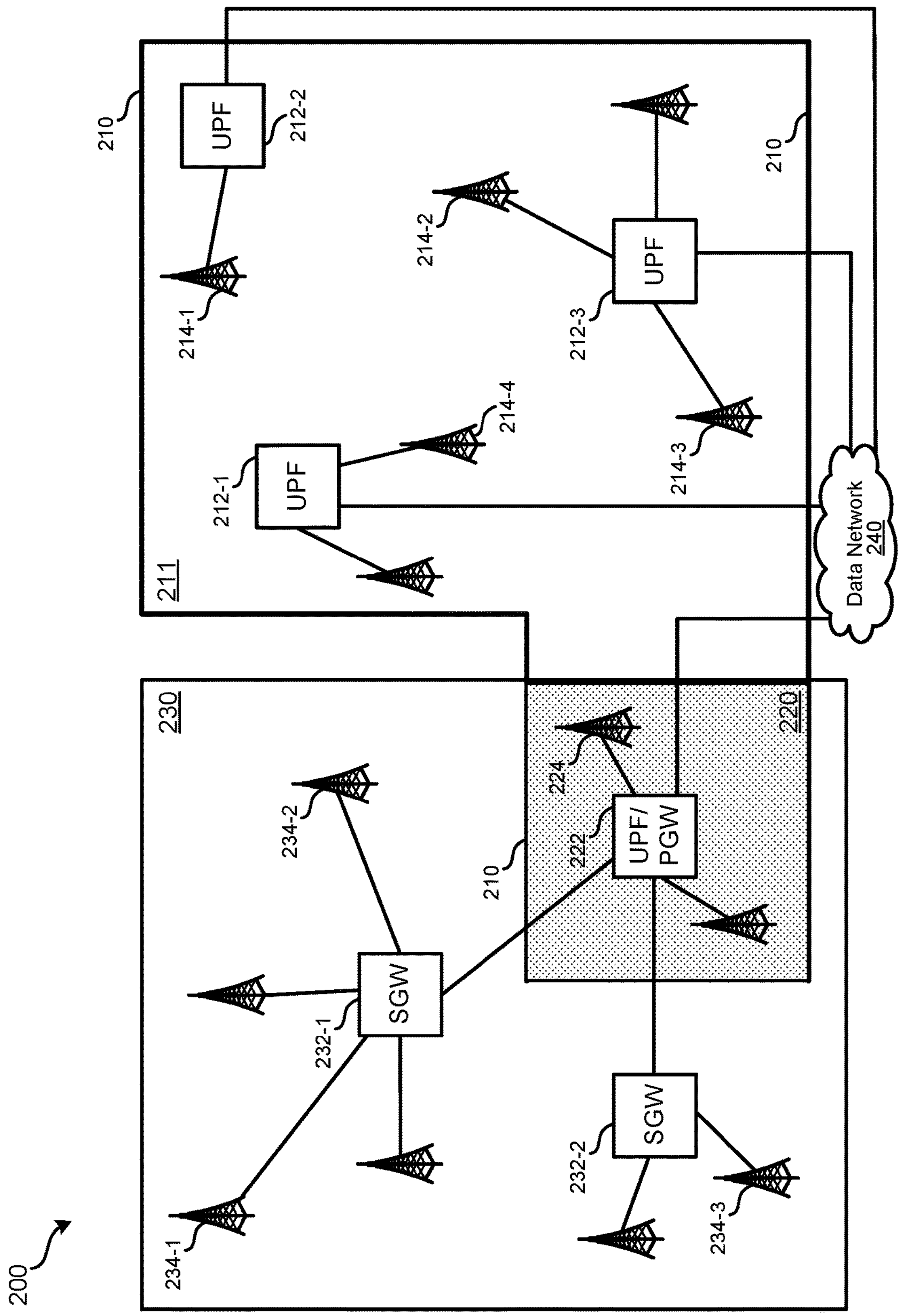
FIG. 2 illustrates an embodiment of a communication environment that includes a compound cellular network.

FIG. 2 illustrates an embodiment of a communication environment 200. Communication environment 200 can represent a more detailed embodiment of FIG. 1A. Communication environment 200 can be used in the context of bridging functionality between a 5G NR and a 4G LTE network on to which UE may roam. Communication environment 200 can include: compound cellular network 210 and cellular network 230. Compound cellular network 210 can include multiple portions, including: standalone network portion 211; and converged core network portion 220. Standalone network portion 211 represents a portion of compound cellular network 210 that includes a RAN and core components that function according to a single RAT, such as 5G. Standalone network portion 211 may only communicate using one RAT, such as 5G NR. Within standalone network portion 211 may be multiple anchor points. For a cellular network using 5G core components, the anchor point can be referred to as a UPF (user plane function). UPF 212 serve as the gateway between UE and data network 240, which may be the Internet. Multiple UPFs 212 (112-1, 212-2, 212-3) are present. Each UPF may serve one or more base stations of base stations 214. Base stations 214 can be gNodeBs (gNBs) in a 5G NR network. The UPF of UPFs 212 that serves a given base station of base stations 214 may be fixed.

As depicted, each UPF of UPF 212 are illustrated as in communication with particular base stations of base stations 214. Depending on the Session and Service Continuity (SSC) mode used for standalone network portion 211, which particular UPF a base station is communicating with on behalf of a UE may vary. For instance, in a first mode (e.g., SSC3), despite a UE moving among base stations, the UE may continue using a UPF as its anchor point until a new connection with a more efficient (e.g., lower latency, higher bandwidth, shorter geographic distance) UPF is made, which can be referred to colloquially as "make-before-break." In another mode (e.g., SSC2), a connection with the previously-used UPF may be ended before a new connection with a more efficient UPF is made, which can be referred to colloquially as "break-before-make." Therefore, while connections indicate the UPF which may be most efficient for a given base station, base stations may route data for UEs with other UPFs if needed.

If the compound cellular network is set to a permissible mode (e.g., SSC2 or SSC3 for 5G NR), as a UE moves within standalone network portion 211 and connects with different base stations of base stations 214, the UPF used to connect the UE with data network 240 can change. For instance, if a UE was connected with base station 214-4, UPF 212-1 may be used as the anchor point for the UE to communicate with data network 240. If the UE moves and begins communicating with base station 214-2, UPF 212-3 can be used as the anchor point for the UE to communicate with data network 240.

Converged core network portion 220 represents a portion of compound cellular network 210 that includes core components that are compatible with multiple RATs (multiple cellular communication protocols, such as 5G NR and 4G LTE. Rather than having the same type of anchor points as standalone network portion 211, converged core network portion 220 can have one or more anchor points that are compatible with multiple RATs. While a UE is operating as part of converged core network portion 220, such as by having a wireless connection with base station 224, functionality may be similar to as if the UE was within standalone network portion 211. That is, the anchor point may be adjusted to be UPF/PGW 222. While the UE is directly connected with a base station of converged core network portion 220, UPF/PGW 222 may function similarly to UPFs 212. For instance, if the UE moves back into standalone network portion 211, a transition may occur such that a different UPF is used as the UE's anchor point.

UPF/PGW 222 (User Plane Function/Packet Gateway) can represent a single component or multiple components functioning in concert. While a UPF may be used as a gateway between data network 240 and UE for 5G communication; a PGW may perform a similar function for 4G communication.

A UE may exit the region of compound cellular network 210 that has converged core regional data centers and may roam on cellular network 230. Cellular network 230 can be operated by a different network provider than compound cellular network 210. For instance, the provider of compound cellular network 210 may have an operating agreement with the provider of cellular network 230. Cellular network 230 operates using a different RAT than standalone network portion 211. For instance, cellular network 230 be a 4G LTE network or a 5G non-standalone network (that uses 4G EPC as its core). 4G LTE and 5G non-standalone (utilizing 4G EPC) differs from a standalone 5G NR network in that anchor points in a 4G EPC core network are fixed. While a UE is communicating with a base station of base stations 234 of cellular network 230, UPF/PGW 222 may remain the anchor point used for the UE regardless of where the UE roams within cellular network 230.

Within cellular network 230, each of base stations 234 may communicate with a serving gateway (SGW) 232. A SGW may forward data communications to the PGW servicing the UE, which would be UPF/PGW 222 of converged core network portion 220. If the UE moves within cellular network 230, the SGW of SGWs 232 used for forwarding data to UPF/PGW 222 may vary, but the anchor point for communicating with data network 240 remains UPF/PGW 222. UPF/PGW 222 may remain the anchor point at least until the UE disconnects from cellular network 230 and reconnects with compound cellular network 210. If the UE reconnects with a base station (e.g., base station 224) that is part of converged core network portion 220, UPF/PGW 222 may remain, at least initially, the anchor point for communication with data network 240. However, if the UE reconnects with another base station, such as base station 214-4, a UPF of UPFs 212 may be used as the anchor point instead.

Converged core network portion 220 may overlap with cellular network 230. That is, converged core network portion 220 may represent a region where UE can communicate with both compound cellular network 210 and cellular network 230. However, since compound cellular network 210 is the UE's home network, the UE would not connect with cellular network 230 unless compound cellular network 210 is unavailable. Regardless of whether converged core network portion 220 overlaps the coverage area of cellular network 230 or not, converged core network portion 220 may be located near a geographic edge of compound cellular network 210. Since the PGW functionality of converged core network portion 220 is only needed when a UE is communicating with a roaming cellular network that requires 4G compatibility or non-standalone 5G compatibility, there can be no need for implementing PGW functionality in standalone network portion 211. One possible goal when choosing a location for converged core network portion 220 may be to locate it such that UPF/PGW 222 will have relatively low latency for a large region in which UE may be expected to roam on cellular network 230.

Figure 3:
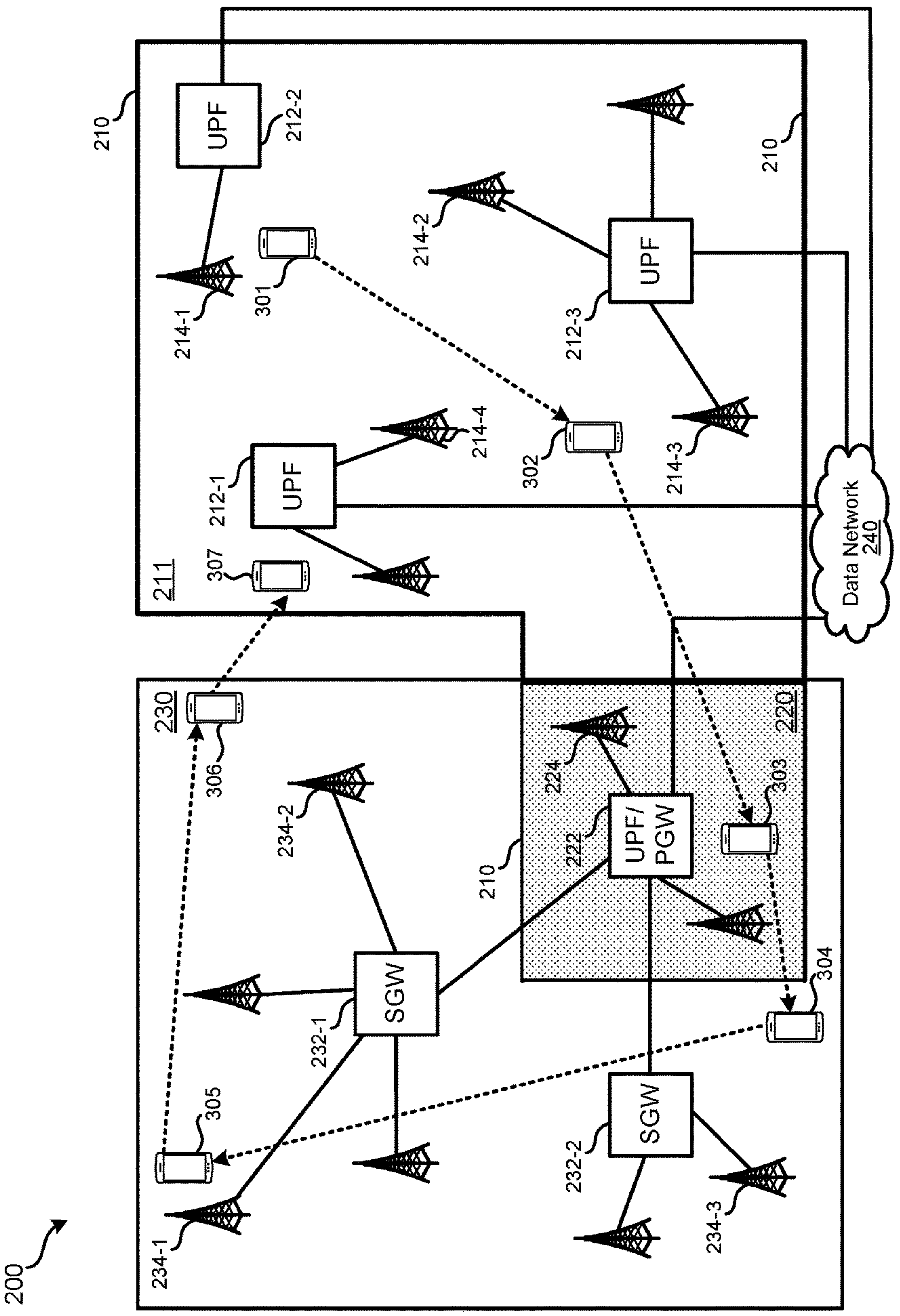
FIG. 3 illustrates an embodiment of user equipment (UE) moving within the compound cellular network and roaming off of the compound cellular network.

FIG. 3 illustrates an embodiment 300 of a UE moving within and roaming off of the compound cellular network. Embodiment 300 represents a UE moving within compound cellular network and roaming on cellular network 230. A UE may be any type of communication equipment that is capable of exchanging data with a wireless cellular network.

Examples of UE can involve smartphones, cellular phones, tablet computer, wireless modems, laptop computers, and wireless access points (APs).

In embodiment 300, a single UE is depicted moving from UE location 301 to UE location 307. At UE location 301, the UE may communicate with base station 214-1 of standalone network portion 211. Assuming standalone network portion 211 is 5G and uses a 5G core network, the UE may connect to data network 240 using UPF 212-2 as the anchor point. The UE may move the UE location 302. At UE location 302, the UE may communicate with base station 214-3. The UE may be transitioned from using UPF 212-2 to using UPF 212-3 as the anchor point to connect with data network 240. The UE may move to UE location 303. At UE location 303, the UE may communicate with base station 224. While base station 224 is part of converged core network portion 220, since the UE is still directly connected with compound cellular network 210, the anchor point can continue to be moved. UPF/PGW 222 may be used as the anchor point for the UE communicating with data network 240.

At UE location 304, the UE has begun roaming on cellular network 230. Assuming cellular network 230 uses 4G as its RAT, UPF/PGW 222 is now locked as the anchor point for the UE to communicate with data network 240. Therefore, regardless of where the UE travels within cellular network 230, UPF/PGW 222 with remain the UE's anchor point. At UE location 304, the UE may communicate with base station 234-3, which may be an eNodeB (eNB). The UE may communicate with UPF/PGW 222 via SGW 232-2. The UE may move to UE location 305. At UE location 305, the UE may communicate with base station 234-1. To communicate with data network 240, data may be routed through SGW 232-1 and UPF/PGW 222. At UE location 306, the UE may be communicating with base station 234-2. Again here, to communicate with data network 240, data may be routed through SGW 232-1 and UPF/PGW 222. However, when the UE moves to UE location 307, since the UE is now back on compound cellular network 210, the anchor point of the UE may be transitioned to UPF 212-1.

Figure 4:
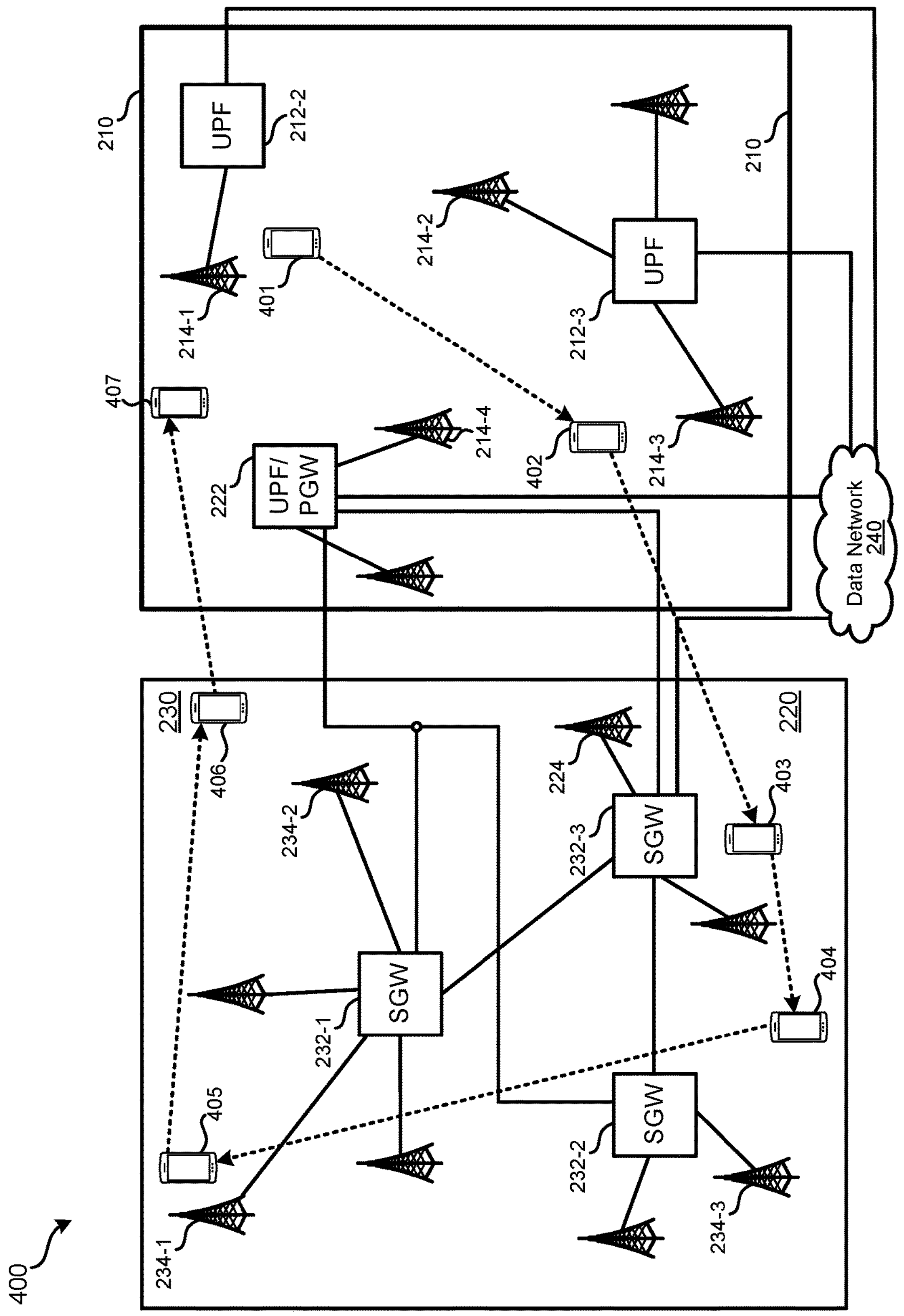
FIG. 4 illustrates another embodiment of UE moving within the compound cellular network and roaming off of the compound cellular network.

FIG. 4 illustrates an embodiment 400 of a UE moving within and roaming off of compound cellular network 210. Embodiment 400 represents a UE moving within compound cellular network and roaming on cellular network 230. In this embodiment, UPF/PGW 222 is not located in a geographic region that physical overlaps a coverage area of cellular network 230.

In embodiment 400, a single UE is depicted moving from UE location 401 to UE location 407. At UE location 401, the UE may communicate with base station 214-1, which is part of a standalone network portion. UPF 212-2 is part of a standalone 5G network portion and uses a 5G core network, therefore the UE may connect to data network 240 using UPF 212-2 as the anchor point. The UE may move the UE location 402. At UE location 402, the UE may communicate with base station 214-3. The UE may be transitioned from using UPF 212-2 to using UPF 212-3 as the anchor point to connect with data network 240. The UE may then move to UE location 403. At UE location 403, the UE may communicate with base station 224, which is connected with SGW 232-3. A PGW that is part of compound cellular network 210 may be used as a fixed anchor point for the remainder of time that the UE is roaming on cellular network 230. SGW 232-3 may communicate with UPF/PGW 222 of compound cellular network 210. In some embodiments, a private network connection is used between SGW 232-3 and UPF/PGW 222; in other embodiments, data network 240 may be used for communication between SGW 232-2 and UPF/PGW 222.

At UE location 404, the UE may communicate with BS 234-3, which communicates with SGW 232-2. SGW 232-2 may communicate with UPF/PGW 222, which remains the anchor point, either via a private network connection or via data network 240. At UE location 405, the UE may communication with BS 234-1, which may communicate with SGW 232-1. SGW 232-1 may communicate with UPF/PGW 222 either via a private network connection or via data network 240. Similarly, at UE location 406, may communicate with BS 234-2, which continues to communicate using SGW 232-1.

At UE location 407, the UE has resumed communicating with compound cellular network 210. Since the UE has resumed communicating with compound cellular network 210, the anchor point is no longer locked. At UE location 407, the UE is communicating with BS 214-1. For BS 214-1, UPF 212-2 is used as the anchor point, either because UPF 212-2 is assigned to BS 214-1 or UPF 212-2 results in one or more beneficial characteristics, such as relatively low latency compared to other UPFs. As the UE moves throughout compound cellular network 210, the UPF used as the anchor point can continue to change. If the UE moves onto cellular network 230, the anchor point may again be locked to a PGW of compound cellular network 210, which may be the same PGW previously used or a different PGW.

Figure 5:
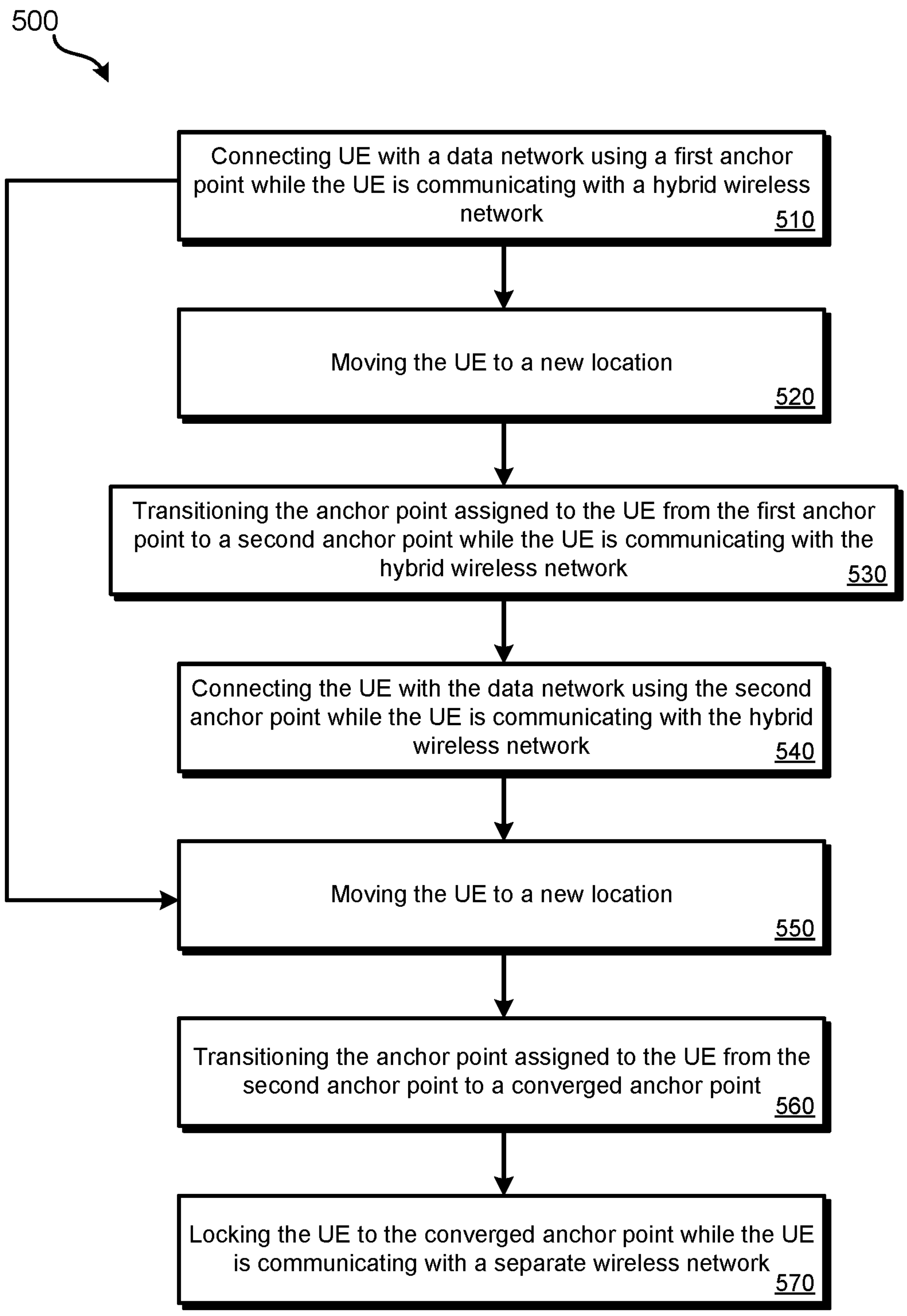
FIG. 5 illustrates an embodiment of a method for managing anchor point movement in a compound cellular network.

Various methods may be performed using the systems detailed in relation to FIGS. 1A through 4. FIG. 5 illustrates an embodiment of a method 500 for managing anchor point movement in a compound cellular network. At block 510, a UE may be connected with a data network via a first anchor point while the UE is communicating with a compound cellular network. This first anchor point may be a UPF that is not capable of functioning as a PGW for 5G RAT or non-standalone 5G. The compound cellular network can include a standalone 5G core portion and a converged 5G/4G core portion. At block 520, the UE may move to a new location that is geographically covered by the compound cellular network. In other embodiments, method 500 may proceed directly to block 550. At block 530, the anchor point assigned to the UE may be transitioned from the first anchor point to a second anchor point. This second anchor point may also be a UPF that is not capable of functioning as a PGW for 5G RAT or non-standalone 5G. Since the UE is connected with the compound cellular network, assuming the compound cellular network is set to a mode that permits it (e.g., SSC3), the anchor point can be changed, such as to allow for more efficient (e.g., lower latency, higher bandwidth) communication between the UE and the data network. At block 540, the UE may be connected with the data network using the second anchor point while the UE is communicating with the compound cellular network.

At block 550, the UE may move to another new physical location. At the new location, the UE may roam on a different cellular network, which can be operated by a different network provider. This other cellular network may be 4G LTE, non-standalone 5G (in both embodiments, 4G EPC is used for the network's core), or some other cellular network standard. At block 560, the compound cellular network may transition the UE's anchor point from the second anchor point to a converged anchor point that can function as a PGW. At block 570, the PGW may be locked as the anchor point for the UE while the UE is roaming on the different cellular network that uses 4G or non-standalone 5G. Regardless of where the UE roams on this other cellular network, the PGW of block 560 will remain the anchor point between a data network and the UE.

Once the UE returns to its home network, the anchor point is no longer locked and the anchor point can be moved among UPFs and converged UPF/PGWs of the compound cellular network. If the UE again roams onto a 4G LTE network or non-standalone 5G network, a converged UPF/PGW is again used as a fixed anchor point for the remainder of the time that the UE is roaming on the 4G or non-standalone 5G cellular network.

Figure 6:
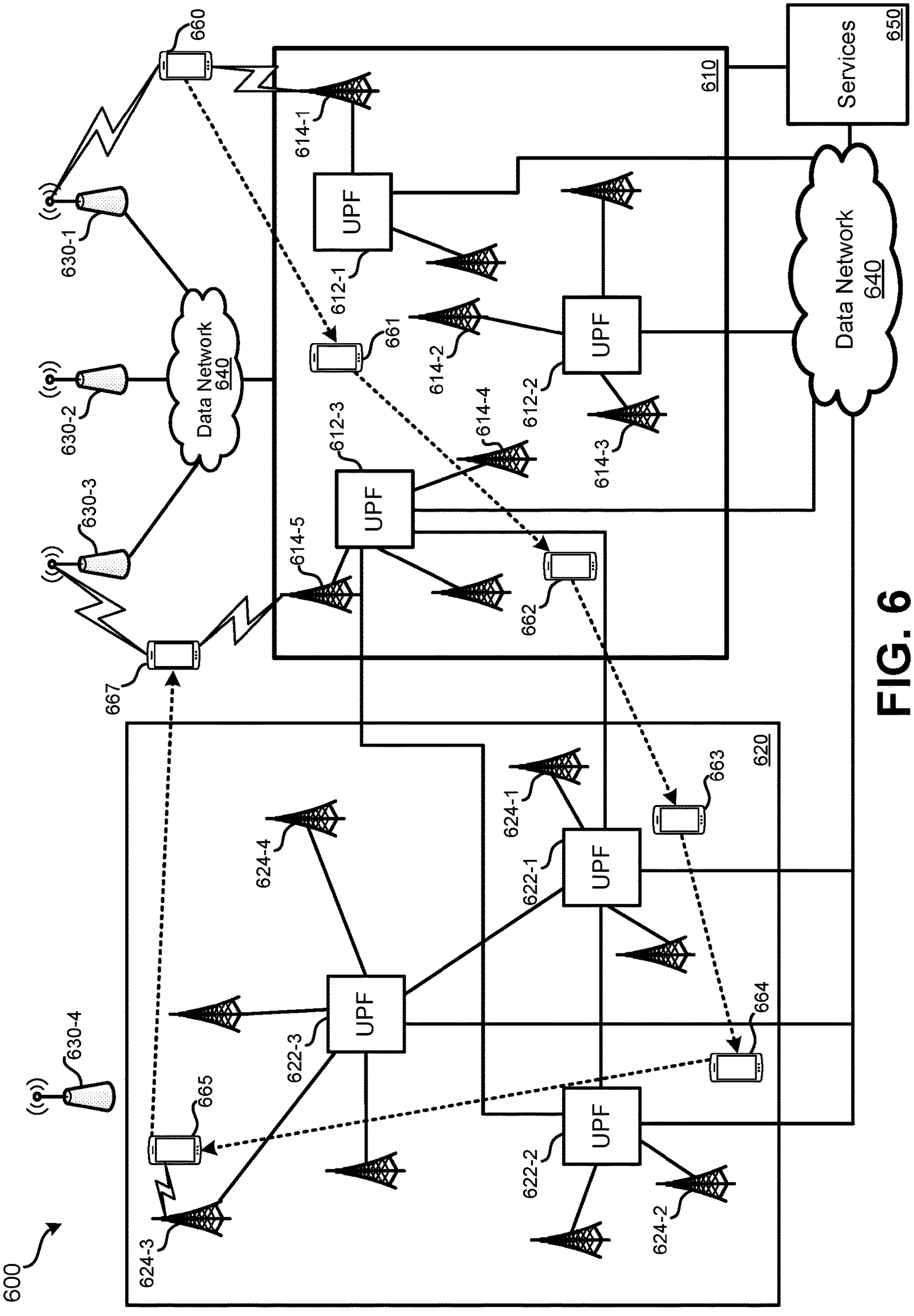
FIG. 6 illustrates an embodiment of user equipment (UE) moving within a network environment that permits a multiple access (MA) packet data unit (PDU) session based on the cellular network connection.

FIG. 6 illustrates an embodiment of system 600 of UE moving within a network environment that permits a multiple access (MA) packet data unit (PDU) session based on the cellular network connection. System 600 can include: cellular network 610; cellular network 620; access points (APs) 630; data network 640; and services 650. When a UE remains connected to its home cellular network, it can leverage a MA PDU session for enhanced service. When the UE roams onto another cellular network, single access PDU may be used instead, thus preventing a local wireless area network from being used in combination with the cellular network connection. When the UE regains coverage by the home cellular network, the MA PDU session can be reestablished.

Services 650 can represent any access-controlled service that can be accessed via the Internet or private data network. As an example, UE may be a unmanned aerial vehicle (UAV) and a service of services 650 may be a flight control system that directly flight of the UAV. As another example, UE may be a piece of manufacturing equipment that is controlled remotely via a service of services 650. Services 650 can be implemented using one or more server system which can be privately managed or can be implemented on a public cloud computing platform, such as Amazon Web Services (AWS).

In system 600, cellular network 610 can represent the home cellular network of UE. This home cellular network can be a 5G NR cellular network. Other various cellular networks, such as cellular network 620 may be used by the UE when the home cellular network, cellular network 610, is unavailable or out of range. (For visualization, cellular network 620 is shown as not overlapping cellular network 610; however, in a real-world implementation, there may be significant overlap between cellular network 620 and cellular network 610.)

The UE's connection with cellular network 610, its home network, can occur via a particular cellular network slice that has been configured to provide particular quality of experience (QoE) and various quality of service (QoS) as specified in a service level agreement (SLA). For instance, a particular client entity, such as a manufacturing company that operates many internet of thing (IoT) devices, may have entered into a SLA with the operator of cellular network 610 for a dedicated slice to be provided for the client's use that meets particular key performance indicators (KPI).

In order to improve the QoE and various QoS parameters, additional data connections can be leveraged in combination with cellular network 610. A multiple access (MA) packet data unit (PDU) session can allow multiple communication paths to be utilized together to improve performance for UE. The combination of multiple communications paths enabled by the UE's connection to its home network effectively functions as a single, more robust communication path. For example, a UE at UE location 660 has a wireless connection with AP 630-1 and BS 614-1. APs 630 can represent wireless local area networks (WLANs), such as WiFi networks or other forms of IEEE 802.11 based networks. Each of APs 630 (e.g., 630-1, 630-2, 630-3, and 630-4) may serve an at least partially different geographic area, such as different parts of a building or different buildings. APs 630 may communicate with data network 640 (which can include the Internet and/or a private communication network) in order to access services 650.

In addition to communicating with services 650 via AP 630-1, communication can occur via BS 614-1 and UPF 612-1 as part of the MA PDU session. Access Traffic Steering Switching and Splitting (ATSSS) can be used to distribute communication traffic between the two communication pathways provided via the MA PDU session. Such an arrangement can help ensure that the UE receives as high QoS for various communication parameters, such as bandwidth (up and down), latency, jitter, etc.

Cellular network 610 operates according to either Session and Service Continuity (SSC) Mode 2 or Mode 3. When the UE moves to UE location 661, the anchor point used for the UE for data network access can be moved to UPF 612-2 since BS 614-2 is being used to communicate with the UE at UE location 661. At this location, if an AP of APs 630 is available, the MA PDU session can allow for access to services 650 to be enhanced by communications being distributed across the communication paths using UPF 612-2 and the AP.

At UE location 662, the UPF used for the UE to access services 650 is again shifted according to either SSC 2 or SSC 3 to UPF 612-3 since the UE is communicating with BS 614-4. However, at UE location 663, the UE is now communicating using cellular network 620 via BS 624-1.

In this embodiment, cellular network 620 can also be a 5G NR cellular network. However, cellular network 620 can be understood as a "public" cellular network, such as a cellular network that the UE is roaming on and on which the UE does not have access to a particular cellular network slice that has been designated to provide a particular QoE or QoS level to the UE. As such, the UE access services 650 via UPF 622-1. The UE is now restricted to using a single access PDU session due to cellular network 620 not being the UE's home network. Therefore, even if within range of an accessible AP (e.g., AP 630-2), the UE cannot use a MA PDU session to improve service; rather, network access is restricted to only via UPF 622-1.

At UE location 664, the anchor point may again be moved to UPF 622-2 while the UE at UE location 664 is communication with BS 624-2. At UE location 665, even though the UE is within range of AP 630-4, because the UE is not connected with cellular network 610, a MA PDU session cannot be used. Therefore, the UE continues to use a single access PDU session via UPF 622-3, which is now being used as the anchor point since the UE is communicating with BS 624-3.

When the UE moves to UE location 667, the UE again begins communicating with cellular network 610 via BS 614-5. An MA PDU session is reestablished allowing the UE to communicate with services 650 via UPF 612-3 and via AP 630-3 concurrently. A UE connected to network 620 (which does not have MA PDU session support), moving to network 610, the PDU session will be single access (e.g., 5G only and not 5G plus WiFi). The UPFs in network 620 do not support MA PDU sessions with ATSSS. In order to support MA PDU sessions (5G plus WiFi and ATSSS), SSC mode 2 and/or SSC mode 3 should be supported to move the anchor point to the UPFs in network 610 that support MA PDU/ATSSS.

In other embodiments, cellular network 620 may not be a 5G cellular network. For example, cellular network 620 may be a 4G Long Term Evolution (LTE) cellular network. As such, rather than having UPFs 622 (UPFs 622-1, 622-2, 622-3), packet gateways (PGWs) may be present. In such an embodiment in which cellular network 620 is a non-5G cellular network, it may not be possible to move the anchor point while the UE is using cellular network 620 for communication. As such, such as discussed in relation to FIG. 4, while roaming on cellular network 620, a particular hybrid UPF/PGW of cellular network 610 may be locked as the anchor point for as long as the UE continues to communicate with cellular network 620, regardless of the location of the UE (e.g., at UE locations 663, 664, and 665). Similarly, while communicating with cellular network 620, a single access PDU session may be used for communication. The anchor point may be released and can return to being moved according to SSC 2 and SSC 3 once the UE resumes communicating with cellular network 610. When communication with cellular network 610 resumes, a MA PDU session may again be used for communication if communication via an AP of APs 630 is available in addition to cellular network 610.

Figure 7:
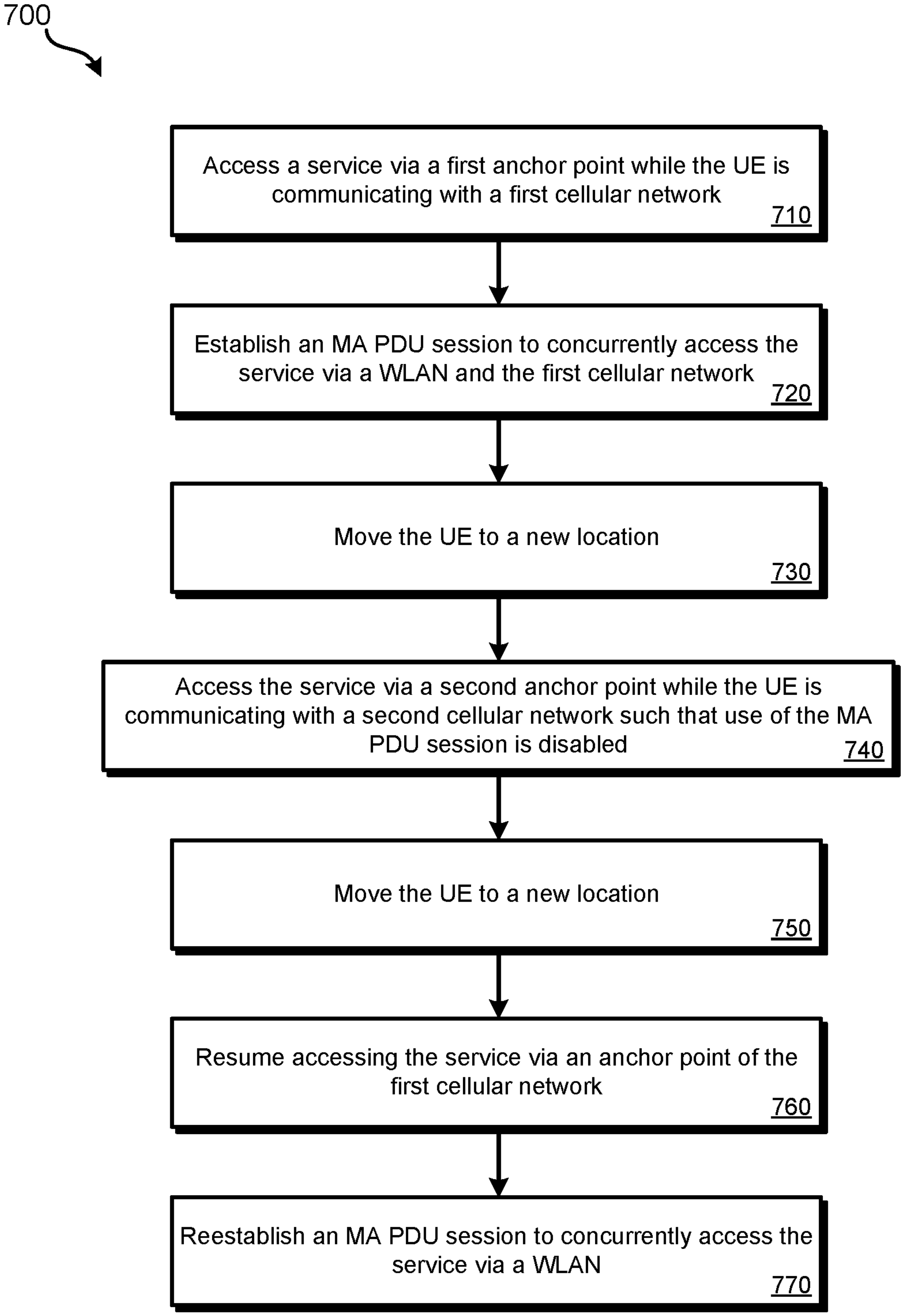
FIG. 7 illustrates an embodiment of a method for managing a MA PDU session based on anchor point movement.

Various methods may be performed using the arrangement of FIG. 6. FIG. 7 illustrates an embodiment of a method 700 for managing a MA PDU session based on anchor point movement. Method 700 can be performed using system 600 of FIG. 6 in which a UE switches between using two 5G NR cellular networks (or beyond) for communication or a 5G NR home cellular network and some other radio access technology (RAT) for a visiting/roaming cellular network, such as 4G LTE.

At block 710, a UE accesses a remote service via a first anchor point of the UE's home cellular network (also referred to as a first cellular network). The first anchor point in a 5G NR cellular network is a UPF that is located at a data center in communication with multiple base stations of the cellular network. While connected with the first cellular network, the UE may be assigned by the cellular network to a particular network slice used for the client operating the UE.

At block 720, the UE can establish an MA PDU session. The MA PDU session can be established by the UE when another wireless access network is also available. The UE can be within range of a WLAN, such as a WiFi network, through which a data network (e.g., the Internet) can be communicated. Such as via ATSSS, the UE can route communication traffic to the remote service using both the WLAN connection and the anchor point of the first cellular network. By using an MA PDU session, UE realizes can improve QoS parameters, such as uplink and downlink bandwidth and latency.

At block 730, the UE may be moved to a new location that results in the first cellular network not being available for communication. Alternatively, at block 730, the UE's location may not change but rather a change in communication state. For example, the first cellular network may become unavailable due to interference or the BS through which the UE was communicating with the first cellular network going offline.

At block 740, the UE accesses the remote service via a second anchor point of a visiting cellular network (also referred to as a second cellular network). If the second cellular network is also 5G, the anchor point can be shifted, such as via SSC 2 or SSC 3, to an anchor point (e.g., UPF) of the second cellular network. The UE communicates with the remote service via the second anchor point. However, by shifting to the second cellular network, an MA PDU session may not be available, as such, the WLAN connection is not used by the UE for communication with the remote service. The UE accesses the remote service via a single access PDU session while the UE remains using the second cellular network for communication.

At block 750, the UE may again be moved to a new location or return to its original location prior to block 730, resulting in the first cellular network again being available for communication. Alternatively, at block 750, the UE's location may not change but rather a change in communicate state occurs. For example, the first cellular network may become available due to interference subsiding or a BS through which the UE can communicate with the first cellular network coming online.

At block 760, the UE can resume accessing the remote service via an anchor point of the UE's home cellular network. This anchor point may be the same anchor point as at block 710 or may be a different anchor point. The anchor point can vary depending on traffic at the anchor point and geographic location.

At block 770, the MA PDU session is reestablished by the UE such that the UE again communicates with the remote service via a WLAN and the home cellular network concurrently. This arrangement results in improved QoS for the UE while accessing the remote service as compared with using only the WLAN or only the home cellular network.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for hybrid cellular communication, comprising:
- a first cellular network comprising a plurality of user plane functions (UPFs), wherein:
  - each UPF of the plurality of UPFs serves as a gateway for user equipment (UE) to communicate with a remotely-hosted service; and
  - which UPF of the plurality of UPFs serves as the gateway for a particular UE is adjusted while the particular UE remains connected with the first cellular network; and
- the UE, wherein:
  - while connected with the first cellular network a multiple access (MA) packet data unit (PDU) session is active that allows for communication to occur concurrently between the UE and the remotely-hosted service via an access point (AP) of a plurality of APs and via a UPF of the plurality of UPFs; and
  - while connected with a second cellular network distinct from the first cellular network, a single access PDU session is active that allows for communication to occur with the remotely-hosted service via a second UPF of the second cellular network.

2. The system of claim 1, wherein the plurality of APs allow for access to one or more wireless local area networks (WLANs).

3. The system of claim 1, wherein after being connected with the second cellular network distinct from the first cellular network and using the single access PDU session for communicating with the remotely-hosted service, reestablish the MA PDU session that allows for communication to occur concurrently between the UE and the remotely-hosted service via the AP of the plurality of APs and via the UPF of the plurality of UPFs.

4. The system of claim 1, wherein after being connected with the second cellular network distinct from the first cellular network and using the single access PDU session for communicating with the remotely-hosted service, establishes a second MA PDU session that allows for communication to occur concurrently between the UE and the remotely-hosted service via a second AP of the plurality of APs and via a third UPF of the plurality of UPFs.

5. The system of claim 1, wherein the first cellular network operates according to session and service continuity (SSC) mode 2 or SSC mode 3.

6. The system of claim 2, wherein the plurality of WLAN APs create one or more WiFi networks.

7. The system of claim 1, wherein the first cellular network is a 5G New Radio (NR) cellular network and the second cellular network is a 5G NR cellular network.

8. The system of claim 1, wherein while the single access PDU session is active that allows for communication to occur with the remotely-hosted service via the second UPF, communication with the service is not performed via a WLAN AP.

9. The system of claim 1, wherein while the MA PDU session is established, Access Traffic Steering Switching and Splitting (ATSSS) is used by the UE to direct traffic via the AP and the UPF.

10. A method for performing hybrid cellular communication, the method comprising:
- accessing, by a user equipment (UE), a remotely-hosted service via a data network, using a first user plane function (UPF) of a plurality of UPFs of a first cellular network;
- establishing, by the UE, a multiple access (MA) packet data unit (PDU) session that allows for communication to occur concurrently between the UE and the remotely-hosted service via an access point (AP) of a plurality of APs and via a UPF of the plurality of UPFs;
- accessing, by the UE, the remotely-hosted service, using a second user plane function (UPF) of a second cellular network, wherein the MA PDU session is not available while connected with the second cellular network and a single access PDU session is used for communicating with the remotely-hosted service;
- resuming, by the UE, accessing the remotely-hosted service via the first UPF of the plurality of UPFs of the first cellular network; and
- in response to resuming accessing the remotely-hosted service via the first UPF, reestablish, by the UE, the MA PDU session.

11. The method of claim 10, wherein the plurality of APs allow for access to one or more wireless local area networks (WLANs).

12. The method of claim 10, wherein in response to the MA PDU session being reestablished, accessing the remotely-hosted service via a second AP of the plurality of APs and a third UPF of the plurality of UPFs.

13. The method of claim 10, wherein the first cellular network and the second cellular network operates according to session and service continuity (SSC) mode 2 or SSC mode 3.

14. The method of claim 11, wherein the plurality of WLAN APs create one or more WiFi networks.

15. The method of claim 11, wherein the first cellular network is a 5G New Radio (NR) cellular network and the second cellular network is a 5G NR cellular network.

16. The method of claim 10, further comprising: moving, by the UE, to a second location from a first location, wherein the second cellular network is accessed at the second location.

17. The method of claim 16, further comprising: moving, by the UE, to the first location from the second location, wherein the first cellular network is accessed at the first location.

18. The method of claim 10, while accessing the remotely-hosted service via the data network, using the first cellular network, using a second UPF of the plurality of UPFs of the first cellular network to access the remotely-hosted service via the data network.

19. The method of claim 10, wherein in response to the MA PDU session being reestablished, accessing the remotely-hosted service via the AP of the plurality of APs and the first UPF of the plurality of UPFs.

20. The method of claim 10, wherein while the MA PDU session is established, using Access Traffic Steering Switching and Splitting (ATSSS) to direct traffic via the AP and the UPF.

* * * * *